United States Patent [11] 3,581,735

[72] Inventors Otto J. Gentner
  Böblingen;
  Karl Grund, Sindelfingen; Miroslav J. Muzik, Herrenberg; Wolfgang E. Ohme; Karoly F. Winkelbauer, Böblingen; Konrad Hammacher, Dusseldorf, all of, Germany
[21] Appl. No. 736,370
[22] Filed June 12, 1968
[45] Patented June 1, 1971
[73] Assignee Hewlett-Packard G.m.b.H.
  Böblingen, Germany

[54] HEARTBEAT FREQUENCY DETERMINING APPARATUS AND METHOD
  9 Claims, 5 Drawing Figs.
[52] U.S. Cl. .................................................. 128/2.05T,
  128/2.05S, 128/2.06F
[51] Int. Cl. .......................................................... A61b 5/02
[50] Field of Search ............................................ 128/2.05
  (MST), 2.06, 201

[56] References Cited
UNITED STATES PATENTS

| 3,144,019 | 8/1964 | Haber | 128/2.06 |
| 3,132,208 | 5/1964 | Dymski et al. | 128/2.05X |
| 3,267,934 | 8/1966 | Thornton | 128/2.06 |
| 3,318,303 | 5/1967 | Hammacher | 128/2.05 |
| 3,463,143 | 8/1969 | Karsh | 128/2.06 |

Primary Examiner—William E. Kamm
Attorney—A. C. Smith

ABSTRACT: Phonocardiographic apparatus particularly useful for measuring fetal heat frequency during prenatal examinations and during parturition monitors the rate at which the two heart sounds per heart cycle recur and includes error-detection and correction circuitry that compensates for undetectable rhythmic heart sounds which would otherwise produce erroneous indications of heart frequency.

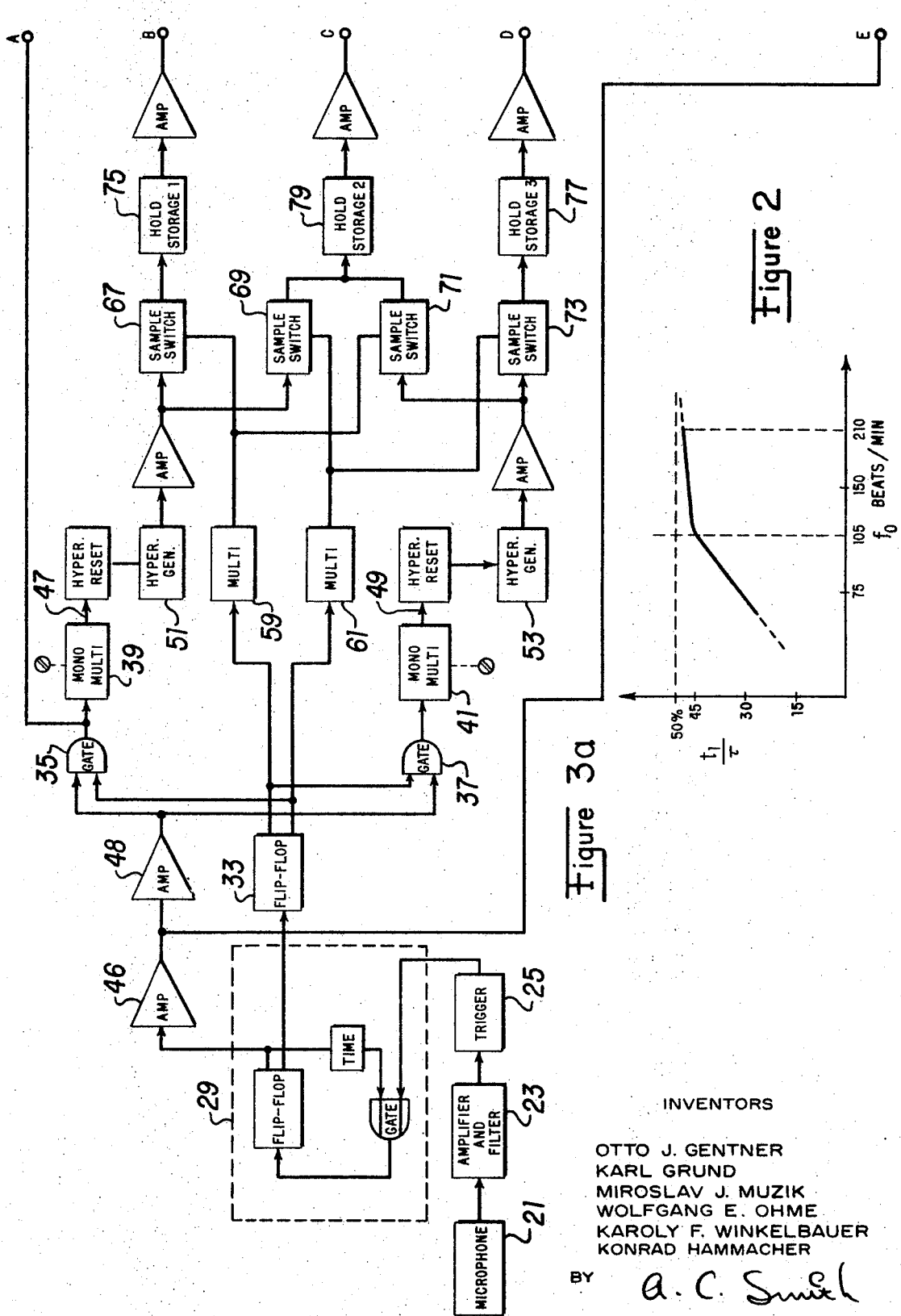

HEARTBEAT FREQUENCY DETERMINING APPARATUS AND METHOD

BACKGROUND OF THE INVENTION

Phonocardiographic techniques are known in which the first and second heart sounds of each heart cycle are independently analyzed in a selected manner to determine the heart frequency. These techniques are described in the literature (see U.S. Pat. No. 3,318,303, entitled METHOD AND APPARATUS FOR OBSERVING HEARTBEAT ACTIVITY, issued May 9, 1967 to Konrad Hammacher) and are primarily useful for detecting and analyzing the weak fetal heartbeat signals that appear in the presence of predominantly larger background noise and disturbances such as the mother's heartbeat, intestinal and respiratory noises of the mother, movement of the fetus and changes in intrauterine pressure during labor activity. The heart frequency of the fetus and the relationship of changes in heart frequency to uterine contractions provide important indications of possible fetal distress, as described in the literature (see, for example, MONITORING FETAL HEART FOR BEAT OF DISTRESS, Roberto Caldeyro-Barcia, Medical World News, Oct. 7, 1966, pgs. 45—47). However, movement of the fetus, tissue density changes between uterine contractions, and the like, frequently cause one of the two heart sounds per fetal heart cycle to become undetectable, thereby producing an apparent decrease in fetal heart frequency. An indication of such apparent decreased heart frequency may cause confusion and may even induce an attending physician to follow unnecessary emergency procedures.

SUMMARY OF THE INVENTION

Accordingly, the present invention monitors the systolic ratio of detected heart sounds for logical evaluation and then corrects the detected heart frequency where combinations of such frequency and ratio are biologically impossible.

DESCRIPTION OF THE DRAWING

FIG. 2 is a graph showing the relationship of the systole of the heart period as a function of heart frequency;

DESCRIPTION OF THE PREFERRED EMBODIMENT

Figure 1:
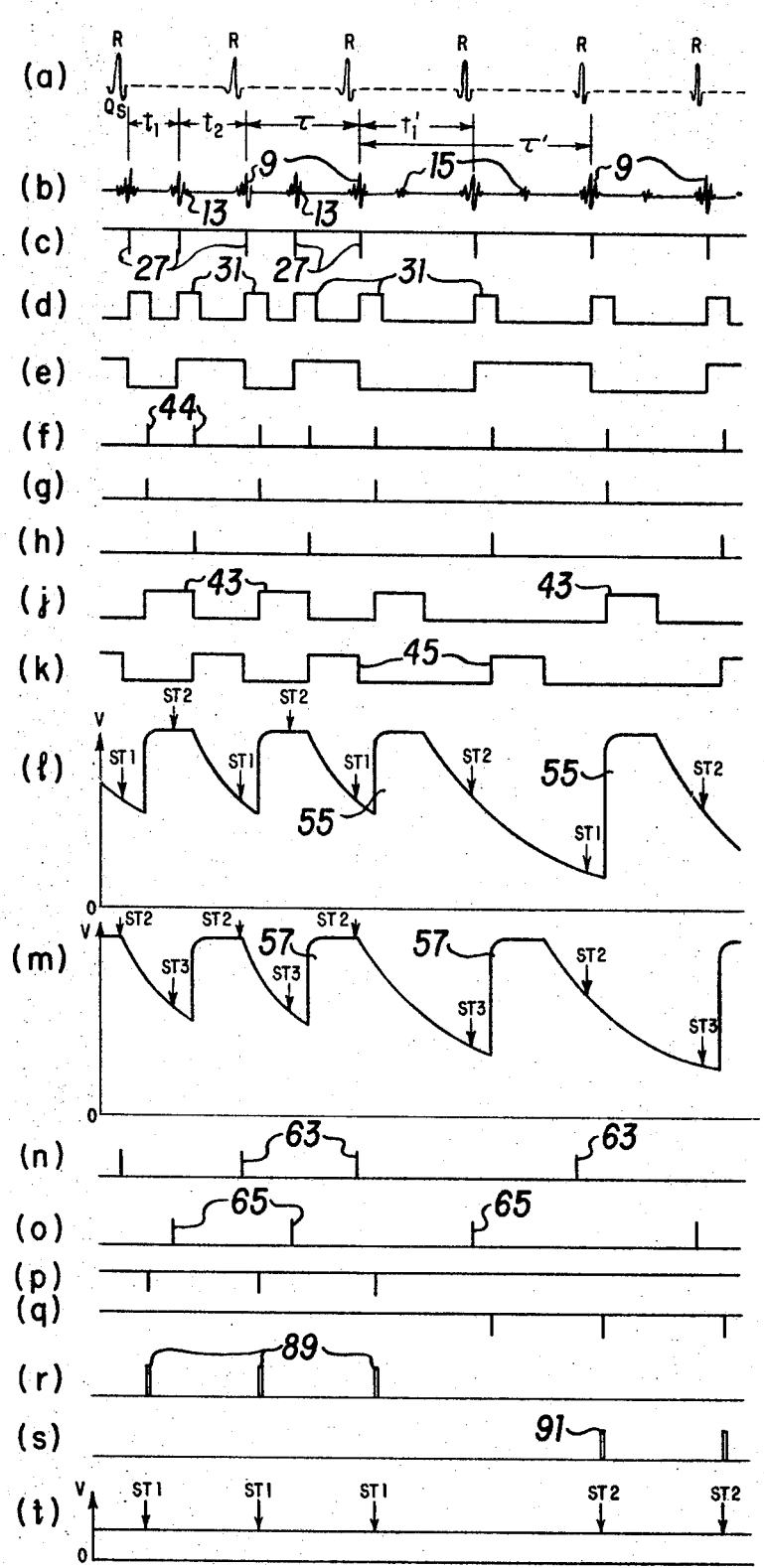
FIG. 1 is a graph showing the operational waveforms of the apparatus of the present invention.

Referring now to the graphs of FIGS. 1(a) and (b) there is shown the relationship of the electrocardiogram and phonocardiogram, respectively, of the heart activity of a fetus. The first sound 9 occurs when the heart contracts and closely follows the R wave of the electrocardiogram. The second sound 13 occurs when the heart valve closes. The time interval $t_1$ between the first and second sounds is called the systole and the time interval $t_2$ between the second sound and the first sound of a successive heart cycle is called the diastole. The systole $t_1$ is always shorter than the diastole $t_2$ and the ratio of $t_1$ to the total period $t_1$ plus $t_2$ (or $\tau$) approaches 50 percent as the heart frequency increases, as shown in FIG. 2. At heart frequencies above a selected value $f_o$ the systole and diastole are more nearly equal (i.e. the ratio of $t_1$ to $\tau$ approaches 50 percent) and at heart frequencies below the selected value $f_o$ the systole and diastole are significantly different. Thus, for an actual heart frequency above the selected value $f_o$, if one heart sound 15 is undetected, the apparent heart frequency is below the selected value $f_o$, but the ratio of $t_1'$ to $\tau'$ of the detected heart sounds is approximately 50 percent. This condition is detected by the present invention as being physiologically impossible and is thus an indication that one heart sound is undetected. Suitable logic circuitry, later described, is actuated by this condition to select for readout the heart frequency corresponding to the interval $t_1'$, which in this case is the correct value. If both sounds are detected, the frequency corresponding to the interval $\tau$ is read out. Since the highest fetal heart frequencies encountered in nature generally do not exceed 210 beats per minute, the selected value $f_o$ is chosen at half the maximum value, or 105 beats per minute. Thus, if the detected heart frequency is above $f_o$ and the systole ratio is approximately 50 percent, the present invention detects this condition as being normal and as an indication that both heart sounds are being detected and therefore that the actual heart frequency is being properly detected.

Figure 4:
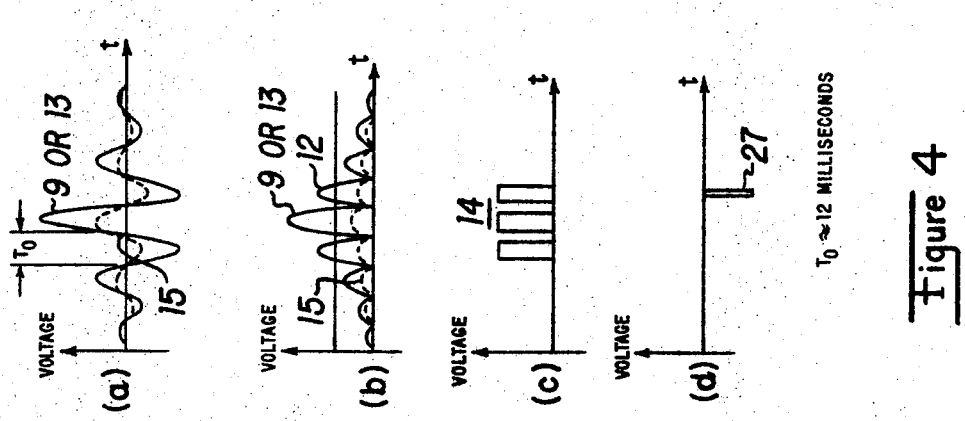
FIG. 4 is a graph showing the operation of the trigger circuit of FIG. 3.
Figure 3B:
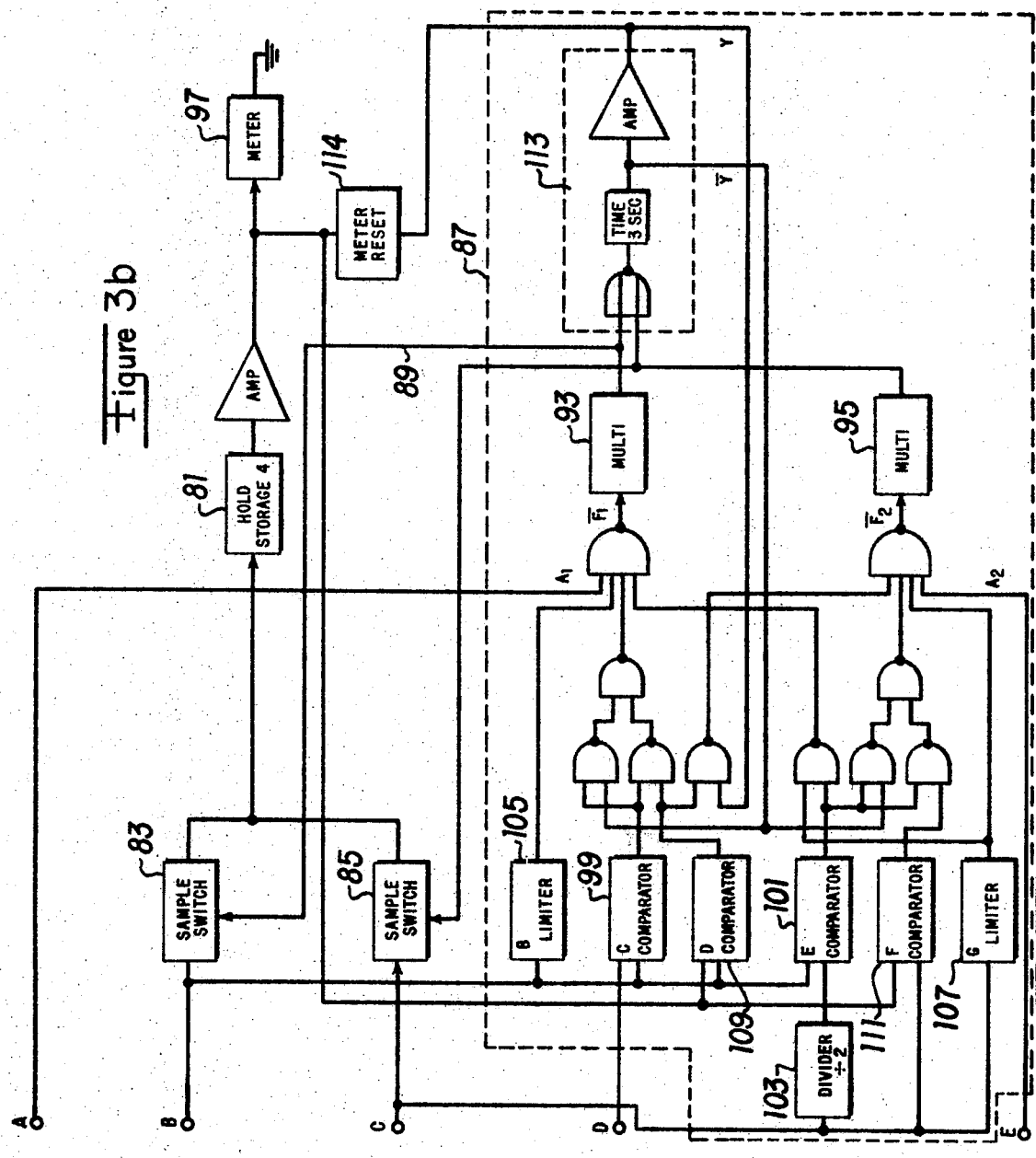
FIG. 3a and b is a schematic diagram of the phonocardiographic apparatus of the present invention.

Referring now to FIG. 3, microphone 21 may be attached to the abdomen of a woman undergoing prenatal examination or parturition for detecting the fetal heartbeat in the presence of other biological and environmental sounds. The microphone is connected to an amplifier and filter 23 which is arranged to amplify the fetal heart sounds occurring in the frequency range from about 60 hertz to about 110 hertz and to reject other frequencies. The output signal from amplifier and filter 23 (FIGS. 1(b) and 4(a)) is applied to trigger circuit 25 which full-wave rectifies the signal 12 and compares the rectified signal 12 with a reference level (FIG. 4(b)). A burst of pulses 14 (FIG. 4(c)) is produced corresponding to the peaks of the rectified signal 12 which exceed the reference level. The trigger circuit 25 then generates a trigger pulse 27 (FIGS. 2(d) and 1(c)) for each detected heart sound from the last pulse of the burst 14 (FIG. 4(c)) that is not followed by another pulse within a time less than about 30 milliseconds. These output pulses 27 from trigger circuit 25 trigger the monostable multivibrator 29 to produce output pulses 31 (FIG. 1(d)) of about 80 millisecond duration. The multivibrator 29 provides dead time following the detection of each heart sound during which no triggering on spurious noises can occur. These pulses 31 are applied to flip-flop 33 to change its operating state (FIG. 1(e)) at the leading edges of each of the pulses 31 associated with the detected heart sounds. The pulses 44 are generated from the trailing edges of pulses 31 from multivibrator 29 and are applied to gates 35 and 37 through the amplifiers 46 and 48. The outputs of flip-flop 33 control gates 35 and 37 so that pulses 44 (FIG. 1(f)) alternately trigger the monostable multivibrators 39 and 41 which produce pulses 43, 45 (FIGS. 1(j), (k)) on separate lines 47, 49. Thus, pulses associated with one detected heart sound appear on line 47 and pulses associated with the next detected heart sound appear on line 49. When both heart sounds per heart cycle are being properly detected, the interval between pulses on lines 47 or 49 corresponds to one heart period and when only one kind of heart sound is being detected, the interval corresponds to two heart periods. These pulses 47, 49 reset the respective hyperbolic signal generators 51, 53 to high-level states (FIGS. 1(l), (m)) so that at the expiration of the pulses 43, 45, these generators can produce hyperbolically decaying signal waveforms 55, 57 for conversion of times between respective ones of the pulses 43, 45 to voltages proportional to the corresponding frequencies. Generators 51, 53 may use common capacitor timing circuits.

At the same time, transitions in the operating state of the flip-flop 33 trigger the multivibrators 59 and 61 to produce sharp pulses 63, 65 (FIGS. 1(n), (o)) for operating the sampling switches 67, 69, 71 and 73. Switches 67 and 69 are connected to receive the hyperbolic signal from generator 51 and are arranged to be triggered alternately by the pulses from multivibrators 59 and 61. Similarly, the switches 71 and 73 are connected to receive the hyperbolic signal from generator 53 and are arranged to be triggered alternately by the pulses from multivibrators 59 and 61. It should be noted that during normal operation on two heart sounds the hyperbolic signal 55 is sampled by switch 67 at the beginning of the dead time provided by the pulse 31 associated with one kind of heart sound of each beat and that the hyperbolic signal 57 is sampled by switch 73 at the beginning of the dead time provided by the pulse 31 associated with the other kind of heart sound of each beat. Thus, the storage circuit 75 following switch 67 stores a voltage which is directly related to the frequency of the heartbeat as determined from the period between heart sounds of one kind. Also, the storage circuit 77 that follows switch 73 stores a voltage which is directly related to the frequency of the heartbeat as determined from the period between heart sounds of the other kind. Also during normal operation, the hyperbolic signals from generators 51 and 53 are each sampled by the switches 69 and 71 during the high-level reset period so that the storage circuit 79 following the switches 69 and 71 stores the high-level reset signal which is unrelated to the heart frequency and which in the normal case is not processed further.

The voltages that appear at the outputs of storage circuits 75 and 79 are continuously monitored so that the correct value of voltage proportional to heart frequency may be transferred to storage circuit 81 through switch 83 or switch 85. The logic circuit 87 is connected to receive the outputs of the storage circuits 75, 77, 79 and 81 for producing control signals 89, 91 (FIGS. 1($r$), ($s$)) for the switches 83, 85 at the outputs of the multivibrators 93, 95, respectively. Thus during normal operation on two heart sounds per beat, the logic circuit 87 produces a signal 89 at the end of the dead-time pulse 31 associated with the first heart sound for transferring through switch 83 the voltage value stored by storage circuit 75 to the output storage circuit 81. During abnormal operation, for example when the second heart sounds 15 per beat become undetectable, the logic circuit 87 produces pulses 91 (FIG. 1($s$)) at the end of the dead-time pulse 31 associated with the first heart sound for transferring through switch 85 the voltage value stored by storage circuit 79 to the output storage circuit 81. It should be noted that the apparent or detected heart frequency determined from the period between corresponding heart sounds when the second heart sound 15 is undetectable is one half the actual frequency and that the voltage value stored in storage circuit 79 is representative of a frequency twice that value. Thus, since the hyperbolic signals 55 and 57 are sampled at the beginning of the dead-time pulses 31 for storage in storage circuit 79, this voltage value during the abnormal operation represents twice the value stored in storage circuit 75 and this voltage, which is transferred to the output storage circuit 81, is therefore representative of the actual heart frequency. The output voltage level (FIG. 1($t$)) stored in circuit 81 thus remains unchanged despite the undetectability of one kind of heart sound per beat. This stored output voltage may be applied through suitable circuitry to an indicating device 97 such as the ordinate-axis marker motor of a time-chart recorder for producing a record with time of heart frequency.

The logic circuit 87 for selecting the proper voltage value to transfer through switches 83 or 85 to the output storage circuit 81 operates as follows: comparator 99 compares the voltage values at the outputs of storage circuits 75 and 77. In the undisturbed case, these voltages are equal and proportional to the heart frequency as determined from the sum $\tau$ of two adjacent time intervals $t_1$, $t_2$. When only one sound per heart cycle is detectable, these voltages are also equal, but proportional to half the heart frequency as determined from the sum $\tau'$ of two adjacent time intervals $t_1'$. Therefore storage circuit 75 during normal operation contains the actual heart frequency as determined from the heart period $\tau$.

Comparator 101 compares the voltage value stored in storage circuit 75 with the voltage value stored in storage circuit 79 divided down by two in divider 103. By this operation equality of periods between successive heart sounds is detected according to the relation $$f = f_1' \quad (1)$$

where $f$ is the frequency corresponding to the sum $\tau$ or $\tau'$ of two adjacent time intervals and $f_1'$ is the frequency corresponding to one time interval $t_1$, $t_2$ or $t_1'$.

Limiters 105 and 107 monitor the frequency range represented by the voltage values presented by storage circuits 75 and 79, respectively. Both limiters allow frequencies in the range from 50 to 210 bpm. It is to be noted that if comparator 101 indicates equality of periods between successive heart sounds and limiter 107 simultaneously determines a frequency range of 50 to 210 bpm; then one kind of heart sound necessarily remains undetected. The states of comparators 99 and 101 and of limiters 105 and 107 determine which frequency-related voltage is to be transferred to output storage 81 as the initial indicated value of heart frequency. As soon as this initial value has been transferred, it is additionally required that any new frequency value be approximately equal to the one already in the output storage 81. Thus the probability of an incorrect frequency being indicated when one heart sound temporarily disappears is markedly reduced. This comparison is made by comparator 109 for the frequency value presented by storage circuit 75 and by comparator 111 for the value in storage 79. The logic circuits are maintained in this restricted condition for, at most, 3 seconds after a last frequency value has been transferred to output storage 81 and they are then returned to their initial state by circuit 113. Also, the circuit 113 and reset switch 114 inhibit further indication of heart frequency on meter 97 after the 3 second interval so that no heart-frequency indication is provided if no new frequency value is transferred to output storage 81. The operation of logic circuit 87 thus may be described by the following partial truth table:

PARTIAL TRUTH TABLE FOR OPERATION OF LOGIC CIRCUIT 87

| B | C | D | E | F | G | Y | $\bar{F}_1$ | $\bar{F}_2$ | B | C | D | E | F | G | Y | $\bar{F}_1$ | $\bar{F}_2$ |
|---|---|---|---|---|---|---|---|---|---|---|---|---|---|---|---|---|---|
| 1 | 1 | 0 | 0 | 0 | 0 | 0 | 1 | 0 | 0 | 0 | 0 | 1 | 0 | 1 | 0 | 0 | 1 |
| 1 | 1 | 0 | 1 | 0 | 0 | 0 | 1 | 0 | 0 | 0 | 0 | 1 | 1 | 1 | 0 | 0 | 1 |
| 1 | 1 | 0 | 0 | 0 | 1 | 0 | 1 | 0 | 0 | 0 | 1 | 1 | 0 | 1 | 0 | 0 | 1 |
| 1 | 1 | 1 | 0 | 0 | 0 | 1 | 1 | 0 | 0 | 0 | 1 | 1 | 1 | 1 | 0 | 0 | 1 |
| 1 | 1 | 1 | 1 | 0 | 0 | 1 | 1 | 0 | 0 | 1 | 0 | 1 | 0 | 1 | 0 | 0 | 1 |
| 1 | 1 | 1 | 0 | 0 | 1 | 1 | 1 | 0 | 0 | 1 | 0 | 1 | 1 | 1 | 0 | 0 | 1 |
| 1 | 1 | 0 | 0 | 1 | 0 | 0 | 1 | 0 | 0 | 1 | 1 | 1 | 0 | 1 | 0 | 0 | 1 |
| 1 | 1 | 0 | 1 | 1 | 0 | 0 | 1 | 0 | 0 | 1 | 1 | 1 | 1 | 1 | 0 | 0 | 1 |
| 1 | 1 | 0 | 0 | 1 | 1 | 0 | 1 | 0 | 1 | 0 | 0 | 1 | 0 | 1 | 0 | 0 | 1 |
| 1 | 1 | 1 | 0 | 1 | 0 | 1 | 1 | 0 | 1 | 0 | 0 | 1 | 1 | 1 | 0 | 0 | 1 |
| 1 | 1 | 1 | 1 | 1 | 0 | 1 | 1 | 0 | 1 | 0 | 1 | 1 | 0 | 1 | 0 | 0 | 1 |
| 1 | 1 | 1 | 0 | 1 | 1 | 1 | 1 | 0 | 1 | 0 | 1 | 1 | 1 | 1 | 0 | 0 | 1 |
| 1 | 1 | 1 | 0 | 0 | 0 | 1 | 1 | 0 | 1 | 1 | 0 | 1 | 0 | 1 | 0 | 0 | 1 |
| 1 | 1 | 0 | 0 | 1 | 0 | 1 | 0 | 1 | 1 | 1 | 0 | 1 | 1 | 1 | 0 | 0 | 1 |
| 1 | 1 | 0 | 1 | 1 | 0 | 1 | 0 | 1 | 1 | 1 | 1 | 1 | 1 | 1 | 0 | 0 | 1 |
| 1 | 1 | 1 | 1 | 0 | 0 | 1 | 0 | 1 | 0 | 0 | 0 | 1 | 1 | 1 | 1 | 0 | 1 |
| 1 | 1 | 1 | 0 | 1 | 1 | 0 | 1 | 0 | 0 | 1 | 0 | 1 | 1 | 1 | 1 | 0 | 1 |
|   |   |   |   |   |   |   |   |   | 0 | 1 | 0 | 1 | 1 | 1 | 1 | 0 | 1 |
|   |   |   |   |   |   |   |   |   | 1 | 0 | 0 | 1 | 1 | 1 | 1 | 0 | 1 |
|   |   |   |   |   |   |   |   |   | 1 | 0 | 0 | 1 | 1 | 1 | 1 | 0 | 1 |
|   |   |   |   |   |   |   |   |   | 1 | 1 | 0 | 1 | 1 | 1 | 0 | 0 | 1 |
|   |   |   |   |   |   |   |   |   | 1 | 1 | 0 | 1 | 1 | 1 | 1 | 0 | 1 |

For all combinations not listed above, $\bar{F}_1$ and $\bar{F}_2$ are 0. The switching functions $\bar{F}_1$ and $\bar{F}_2$ derived from the truth table are:

$$\bar{F}_1 = BC\overline{EG}\,(\overline{Y}+D) \quad (2)$$
$$\bar{F}_2 = EG\,(\overline{Y}+\overline{D}F) \quad (3)$$

where the following definitions apply:

B=1: Voltage in storage 75 represents a frequency between 50 bpm. and 210 bpm.

C=1: Frequency difference between storages 75 and 77 smaller than an allowed limit of, say, ±7 bpm.

D=1: Frequency difference of values in output storage 81 and storage 75 smaller than ±7 bpm.

E=1: Periods between successive sounds are equal, i.e. the frequency values corresponding to adjacent intervals differ by less than ±7 bpm.

F=1: Frequency difference of values in output storage 81 and storage 79 smaller than ±7 bpm.

G=1: Frequency in storage 79 in the range of 50 to 210 bpm.

Y=1: Time elapsed since last value was transferred to output storage 81 is shorter than 3 seconds.

The transfer signal $A_1$ from gate 35 is generated from every second sound detected (FIG. 1($g$)) and transfer signal $A_2$ from amplifier 46 is generated from every sound detected (FIG. 1($f$)).

We claim:

1. Apparatus for determining heartbeat frequency comprising:

sensor means for producing electrical signals representative of pulsating heart action of a patient;

pulse means having two output channels and responsive to said electrical signals for producing pulses alternately and consecutively on one and the other of said two output channels in response to pulsating heart action of the patient; and means connected to the pulse means and responsive to pulses on the two output channels for producing an output representative of approximately twice the repetition rate of pulses appearing on one of the two output channels in response to the time interval between occurrence of pulses on the two output channels becoming approximately equal at a repetition rate of pulses on one of said channels which is below a predetermined value, and for producing said output representative of approximately the repetition rate of pulses appearing on one of the two channels in response to the time interval between occurrence of pulses on the two channels being unequal at a repetition rate of pulses on one of the channels which is below said predetermined value and in response to the time interval between occurrence of pulses on one of the two channels being approximately equal at a repetition rate of pulses on one of the channels which is above said predetermined value.

2. Apparatus as in claim 1 wherein said last-named means produces said output in response to the time intervals between pulses on alternate ones of the two output channels being approximately equal at a repetition rate of pulses on one of the channels less than about 120 pulses per minute.

3. Apparatus as in claim 1 wherein said last-named means includes first converter means responsive to pulses on at least one of the output channels for producing a signal related to the time interval between pulses on said one of the output channels;

second converter means responsive to pulses on the output channels for producing a signal related to the time interval between a pair of pulses appearing consecutively on alternate ones of the output channels; and circuit means connected to the first and second converter means for selectively operating in a first condition to produce said output from the signal produced by said first converter means and also in a second condition to produce said output from the signal produced by said second converter means; and logic means connected to said circuit means for selectively operating the same in said first and second conditions in response to selected logical combinations of the signals from said first and second converter means.

4. Apparatus as in claim 3 wherein:

said last-named means also includes third converter means connected to respond to pulses on at least the other of said output channels for producing a signal related to the time interval between pulses appearing on said other of the output channels; and said logic means operates said circuit means in said second condition to produce said output proportional to the signal from the second converter means in response to the signals produced by the first and third converter means being approximately equal and the signal produced by the second converter means being approximately equal to twice the signal produced by one of the first and third converter means at a repetition rate of pulses on one of said output channels less than said predetermined value.

5. Apparatus as in claim 4 wherein said logic means operates said circuit means in the first condition to produce said output proportional to the signal from one of the first and third converter means in response to the combination: (a) of signals at the outputs of the first and third converter means being approximately equal for pulses appearing alternately and consecutively on the two output channels at time intervals which are approximately equal at a repetition rate of pulses on one of the output channels greater than said predetermined value, (b) of signals at the outputs of the first and third converter means being approximately equal for pulses appearing alternately and consecutively on the two output channels at time intervals which are unequal at a repetition rate of pulses on one of the output channels greater than said predetermined value, and (c) of signals at the outputs of the first and third converter means being approximately equal for pulses appearing alternately and consecutively on the two output channels at time intervals which are unequal at a repetition rate of pulses on one of the output channels less than said predetermined value.

6. Apparatus as in claim 4 wherein:

said logic means operates said circuit means in the second condition to produce said output proportional to the signal at the output of the second converter means in response to pulses appearing alternately and consecutively on the two output channels at time intervals which are approximately equal at a repetition rate of pulses on one of said output channels less than said predetermined value.

7. The method of determining heartbeat frequency comprising the steps of:

producing a pair of electrical signals representative of selected characteristics of each pulsating heart action of a patient;

generating pulses in each of a pair of pulse trains in response to alternate and consecutive ones of said electrical signals produced in response to pulsating heart actions of a patient;

producing an output representative of approximately twice the repetition rate of pulses in one pulse train in response to the time intervals between alternate and consecutive occurrences of pulses in the pulse trains becoming approximately equal at a repetition rate of pulses in one of the pulse trains below a predetermined value; and producing an output representative of approximately the repetition rate of pulses in one pulse train in response to the time intervals between alternate and consecutive occurrences of pulses in the pulse trains being approximately equal at a repetition rate of pulses in one of the pulse trains above the predetermined value.

8. The method of claim 7 in which said predetermined value of repetition rate of pulses in one of the pulse trains is about 120 pulses per minute.

9. The method of claim 7 including the steps of:

producing a first signal representative of the frequency of pulses in one of the pair of pulse trains;

producing a second signal which is indicative of approximately twice the frequency of pulses represented by said first signal; and in the step of producing said output said output is produced from the second signal in response to the time intervals between pulses appearing alternately and consecutively in said pair of pulse trains attaining approximate equality at a repetition rate of pulses in one of the pulse trains less than said predetermined value.